United States Patent
Kaelberer et al.

(10) Patent No.: US 8,573,059 B2
(45) Date of Patent: Nov. 5, 2013

(54) ACCELERATION SENSOR HAVING AN ELECTRODE BRIDGE

(75) Inventors: Arnd Kaelberer, Schlierbach (DE); Lars Tebje, Reutlingen (DE); Christian Bierhoff, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 13/057,121

(22) PCT Filed: Aug. 4, 2009

(86) PCT No.: PCT/EP2009/060097
§ 371 (c)(1),
(2), (4) Date: Apr. 28, 2011

(87) PCT Pub. No.: WO2010/034555
PCT Pub. Date: Apr. 1, 2010

(65) Prior Publication Data
US 2011/0197678 A1    Aug. 18, 2011

(30) Foreign Application Priority Data
Sep. 25, 2008 (DE) .......................... 10 2008 042 358

(51) Int. Cl.
*G01P 15/125* (2006.01)
(52) U.S. Cl.
USPC ..................................................... 73/514.32

(58) Field of Classification Search
USPC ........................................................ 73/514.32
See application file for complete search history.

(56) References Cited

U.S. PATENT DOCUMENTS
2004/0055382 A1    3/2004    Samuels et al.

FOREIGN PATENT DOCUMENTS

| DE | 42 26 430 | 2/1994 |
|---|---|---|
| DE | 195 37 814 | 4/1997 |
| EP | 1 640 726 | 3/2006 |

OTHER PUBLICATIONS

"Surface micromechanical sensors as electrical test structures for characterizing their manufacturing processes" Matute, Matthias; University of Tübingen ; 2003, 5 pages.

*Primary Examiner* — John Chapman, Jr.
(74) *Attorney, Agent, or Firm* — Kenyon & Kenyon LLP

(57) ABSTRACT

A capacitive micromechanical acceleration sensor has a substrate and a micromechanical functional layer situated above the substrate. A seismic mass, a suspension and fixed electrodes are situated in the micromechanical functional layer. The fixed electrodes are electrically connected to one another on a first and second side, respectively, of the suspension using buried conductor tracks. The fixed electrodes are connected to one another between the first and second side of the suspension using first and second conductors in the micromechanical functional layer.

3 Claims, 2 Drawing Sheets

ACCELERATION SENSOR HAVING AN ELECTRODE BRIDGE

BACKGROUND INFORMATION

Capacitive lateral acceleration sensors are implemented according to the related art as movable seismic masses that simultaneously have an electrode function. The seismic mass is movably connected to the suspension via a spring, the suspension being fixedly joined to the substrate lying under it. Counter-electrodes fixedly joined to the underlying substrate are present for electrical detection, the counter-electrodes together with the seismic mass constituting electrode cells. For the suppression of undesired interference, the electrode cells are frequently placed symmetrically with respect to the central axis of the sensor, i.e. to the left and right of the suspension in FIG. 1. Electrically conductive connections are necessary between the electrodes of both sides. In previous sensors, the connections were implemented by either buried silicon conductor tracks or by silicon conductor tracks on the surface, outside of the sensor core.

Such sensors are described in greater detail, for example in the RB dissertation "Surface micromechanical sensors as electrical test structures for characterizing their manufacturing processes;" Maute, Matthias; University of Tübingen; 2003.

SUMMARY OF THE INVENTION

The present invention relates to a capacitive micromechanical acceleration sensor having a substrate and a micromechanical functional layer situated above the substrate, a seismic mass, a suspension and fixed electrodes being situated in the micromechanical functional layer. The fixed electrodes are electrically connected to one another on a first and second side, respectively, of the suspension using buried conductor tracks. The fixed electrodes are connected to one another on a first and second side of the suspension using first and second conductors in the micromechanical functional layer.

An object of the present invention is to implement the electrical connection of the fixed electrodes using silicon conductor tracks on the surface in the center of the sensor core. The silicon conductor tracks are routed in the micromechanical functional layer. To that end, the sensor suspension is interrupted at one point to create a pass-through for the electrode bridges. Compared to the previous conductor bridges outside of the sensor core, this represents a significant saving of space. Specifically for multi-channel acceleration sensors, the size of the sensor core area on the chip may be reduced overall, which makes more cost-effective manufacturing of the chip possible.

By eliminating electrode bridges outside of the sensor core, the present invention makes it possible to manufacture more compact and thus more cost-effective sensor cores compared to the related art, specifically for multi-channel acceleration sensors.

DETAILED DESCRIPTION

Figure 1:
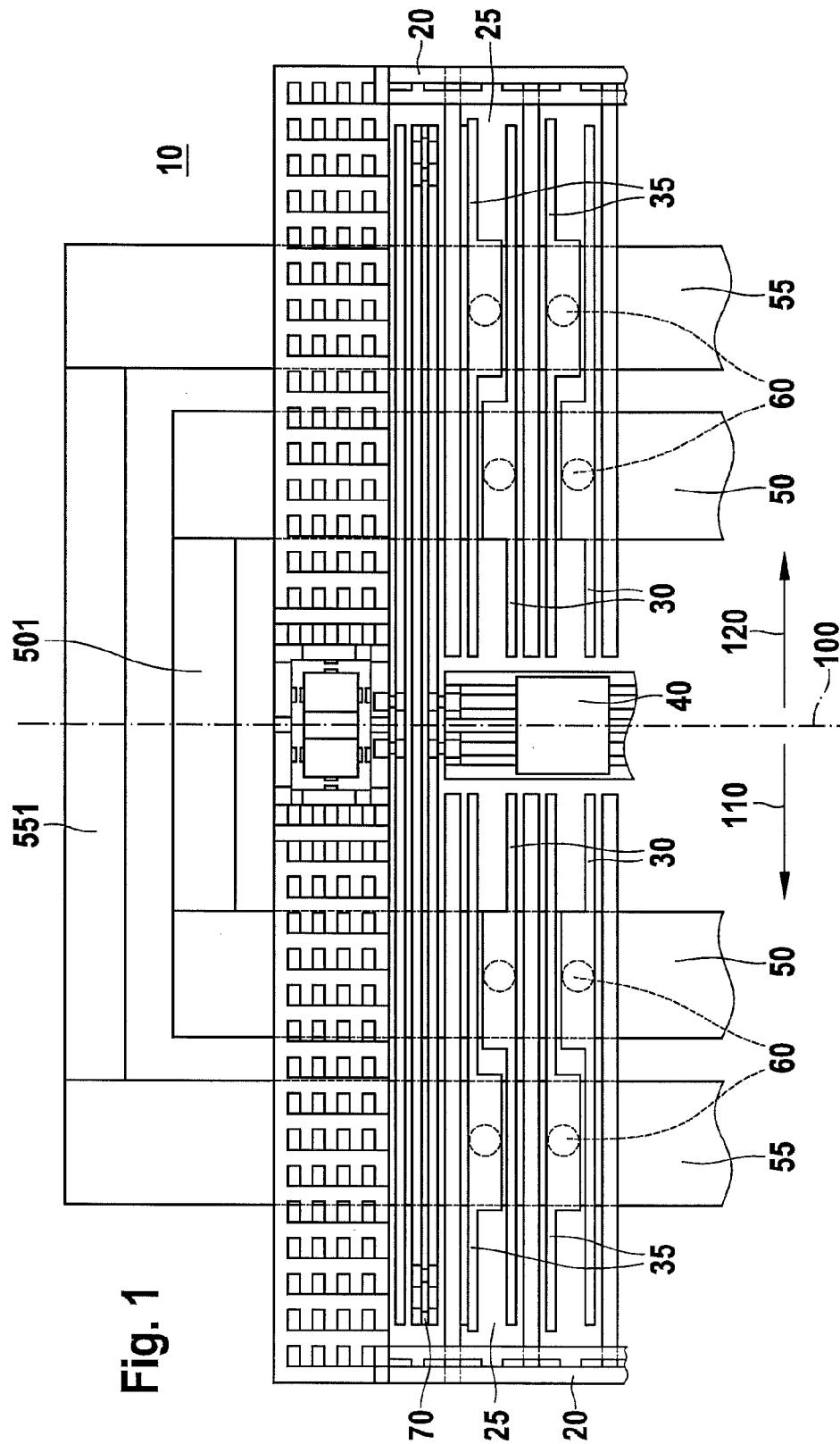
FIG. 1 schematically shows a micromechanical linear acceleration sensor from the related art.

FIG. 1 schematically shows a micromechanical linear acceleration sensor from the related art. The partial representation is viewed from above. Depicted is one half of a capacitive micromechanical acceleration sensor having a substrate 10 and a micromechanical functional layer situated above substrate 10. An annular-shaped seismic mass 20 (viewed in part here) enclosing an inner area 25 is situated in the micromechanical functional layer. A suspension 40 is situated in inner area 25, the suspension being anchored on substrate 10 and suspending annular-shaped seismic mass 20 using a spring mechanism 70. Annular-shaped seismic mass 20 has an inversely symmetrical axis 100, which passes through suspension 40. In inner area 25, which is enclosed by seismic mass 20, first and second fixed electrodes 30 and 35 are situated on a first side 110 of inversely symmetrical axis 100 in the micromechanical functional layer and first and second fixed electrodes 30 and 35 are also situated on a second side 120 of inversely symmetrical axis 100 in the micromechanical functional layer. First fixed electrodes 30 are connected to a first conductor track 50 on both first side 110 and second side 120 and second fixed electrodes 35 are connected to a second conductor track 55. The conductor tracks in this case are buried silicon conductor tracks. They are situated in a separate layer which is situated between substrate 10 and the micromechanical functional layer. Fixed electrodes 30 and 35 implemented in the micromechanical functional layer are connected to the buried silicon conductor tracks and to substrate 10 via connecting points 60. Suspension 40 is rigidly connected to substrate 10 and is not movable. Electrode bridges 501 and 551 are provided for connecting each of conductor tracks 50 and 55 on first and second side 110 and 120, the electrode bridges being implemented outside of annular-shaped seismic mass 20 in the layer of the buried silicon conductor tracks.

In these acceleration sensors, the acceleration is measured capacitively, i.e., via a change of the distance of capacitor electrodes. Movable and fixed electrodes are diametrically opposed. Two fixed electrode fingers are needed for each movable electrode finger for a differential evaluation using capacitances changing in opposite directions. To achieve adequately high capacitances, a large number of fixed and movable electrodes are interconnected, the individual electrode cells being situated symmetrical to the central axis of the sensor to improve the sensitivity to interference. As shown in FIG. 1, the potentials of the electrodes are routed by the two separated conductor tracks 50 and 55 (buried silicon conductor tracks). Conductor tracks 50 and 55 are connected to one another on both sides of the axis of symmetry, the connection being implemented by conductor bridges 501 and 551 outside of the sensor core. Space must be reserved for such conductor bridges which amounts to the overall size (chip area) of the sensor and which increases the distance between the sensor cores in multi-channel sensors.

Figure 2:
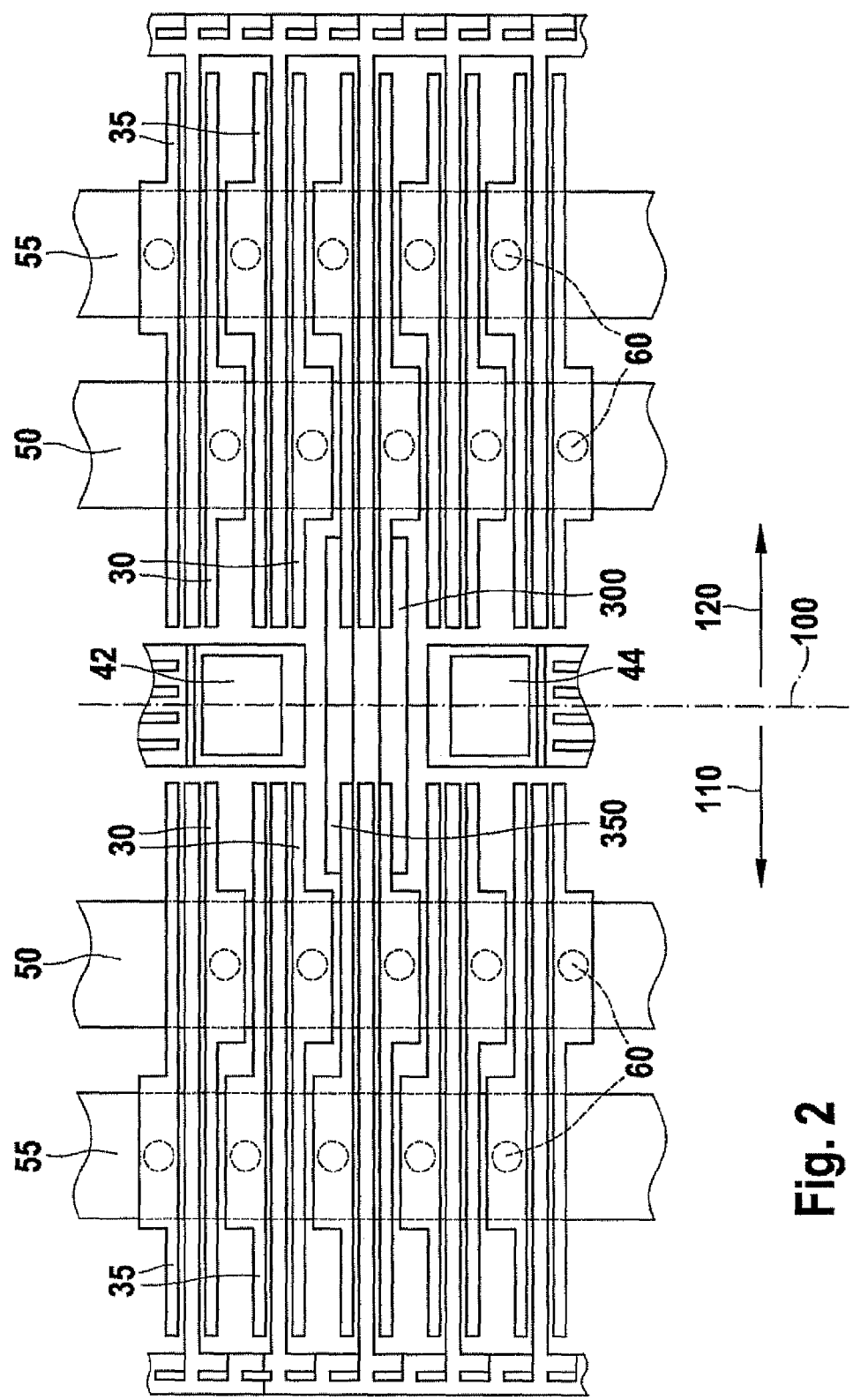
FIG. 2 schematically shows a micromechanical linear acceleration sensor according to the present invention.

FIG. 2 schematically shows a micromechanical linear acceleration sensor according to the present invention. The partial representation is again viewed from above. The central area of a capacitive micromechanical acceleration sensor is shown.

This detail shows a more compact possibility according to the present invention for connecting conductor tracks. The bridges between the two conductor tracks 50 and 55 are in this case implemented in the center of the sensor without an additional space requirement. To that end, sensor suspension 40 must be interrupted. The sensor suspension is designed as an interrupted suspension 42, 44. The fixed electrodes which are now directly diametrically opposed, i.e., without a suspension situated between them, are connected to one another by a conducting bridge in the micromechanical functional layer. Due to the positioning of the first and second electrodes according to FIG. 1 and FIG. 2, the fixed electrodes are of "correct potential" with regard to one another and may be connected to one another directly. As shown in FIG. 2, according to the present invention, a first fixed electrode 30 situated on first side 110 is conductively connected to a first fixed electrode 30 situated on second side 120 using a first conductor 300 in the micromechanical functional layer. In addition, a second fixed electrode 35 situated on first side 110 is conductively connected to a second fixed electrode 35 situated on second side 120 using a second conductor 350 in the micromechanical functional layer. First and second conductors 300 and 350 represent electrode bridges. The conductor bridges shown in the related art outside the sensor core are eliminated.

What is claimed is:

1. A capacitive micromechanical acceleration sensor comprising:
    a substrate;
    a micromechanical functional layer situated above the substrate;
    an annular-shaped seismic mass enclosing an inner area being situated in the micromechanical functional layer;
    a suspension situated in the inner area, the suspension being anchored on the substrate and suspending the annular-shaped seismic mass using a spring mechanism;
    first and second fixed electrodes situated in the inner area on a first side of the suspension in the micromechanical functional layer; and
    third and fourth fixed electrodes situated on a second side of the suspension in the micromechanical functional layer,
    wherein the first and third fixed electrodes are connected to a first conductor track and the second and fourth fixed electrodes are connected to a second conductor track on the first and second sides, respectively, of the suspension, and
    wherein at least one of:
    (a) at least one first fixed electrode situated on the first side is conductively connected to a third fixed electrode situated on the second side using a first conductor in the micromechanical functional layer, and
    (b) at least one second fixed electrode situated on the first side is conductively connected to a fourth fixed electrode situated on the second side using a second conductor in the micromechanical functional layer.

2. The acceleration sensor according to claim 1, wherein the substrate is a silicon substrate and the micromechanical functional layer is a polycrystalline silicon layer.

3. The acceleration sensor according to claim 1, wherein the suspension is a divided suspension having a recess, and at least one of the first conductor and the second conductor is situated in the recess.

* * * * *

UNITED STATES PATENT AND TRADEMARK OFFICE
CERTIFICATE OF CORRECTION

PATENT NO.       : 8,573,059 B2                                               Page 1 of 1
APPLICATION NO. : 13/057121
DATED            : November 5, 2013
INVENTOR(S)      : Kaelberer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 310 days.

Signed and Sealed this
Twenty-second Day of September, 2015

Michelle K. Lee
*Director of the United States Patent and Trademark Office*